United States Patent
Strauss et al.

(10) Patent No.: US 10,773,814 B2
(45) Date of Patent: Sep. 15, 2020

(54) CONTROL SYSTEM FOR ROTORCRAFT IN-FLIGHT ENGINE RESTARTING

(71) Applicant: Sikorsky Aircraft Corporation, Stratford, CT (US)

(72) Inventors: Michael Peter Strauss, New Haven, CT (US); Michael Joseph DeVita, Cos Cob, CT (US); Mark Denton Bystry, Jr., Decatur, GA (US); Joseph Lawrence Simonetti, Southbury, CT (US); Carl A. Palmer, Pittsford, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 321 days.

(21) Appl. No.: 15/744,422

(22) PCT Filed: Jul. 20, 2016

(86) PCT No.: PCT/US2016/043094
§ 371 (c)(1),
(2) Date: Jan. 12, 2018

(87) PCT Pub. No.: WO2017/015341
PCT Pub. Date: Jan. 26, 2017

(65) Prior Publication Data
US 2018/0201386 A1 Jul. 19, 2018

Related U.S. Application Data

(60) Provisional application No. 62/194,464, filed on Jul. 20, 2015.

(51) Int. Cl.
*B64D 31/06* (2006.01)
*B64C 27/12* (2006.01)
(Continued)

(52) U.S. Cl.
CPC .............. *B64D 31/06* (2013.01); *B64C 27/12* (2013.01); *B64D 27/14* (2013.01); *B64D 31/14* (2013.01);
(Continued)

(58) Field of Classification Search
CPC ........ B64D 31/06; B64D 27/14; B64D 31/14; B64D 45/00; B64D 2045/0085;
(Continued)

(56) References Cited

U.S. PATENT DOCUMENTS 5,403,155 A 4/1995 Head et al.
9,355,571 B2 * 5/2016 Rucci .................... A63H 27/12
(Continued)

FOREIGN PATENT DOCUMENTS

FR 2942001 A1 8/2010

OTHER PUBLICATIONS

Extented European Search Report, dated Jan. 25, 2019, pp. 1-6.
(Continued)

*Primary Examiner* — Sze-Hon Kong
(74) *Attorney, Agent, or Firm* — Michael Best & Friedrich LLP

(57) ABSTRACT

A control system for an in-flight engine restart system of a rotorcraft includes an engine control unit that controls and detects status of an engine. The control system also includes a flight control computer that communicates with the engine control unit, an engine operation control system, and a pilot interface including pilot controls. The engine operation control system includes a processor that initiates a health check of the in-flight engine restart system to determine an in-flight engine restart system status. The engine operation control system processes engine mode of operation commands to establish an engine mode of operation, and delivers commands to aspects of the in-flight engine restart system (Continued)

including the engine control unit based on processing of the engine mode of operation commands. The engine operation control system reports the in-flight engine restart system status and results of the engine mode of operation commands to the flight control computer.

13 Claims, 4 Drawing Sheets

(51) Int. Cl.
| | | |
|---|---|---|
| *F02C 7/262* | (2006.01) | |
| *F02C 7/268* | (2006.01) | |
| *B64D 31/14* | (2006.01) | |
| *F02C 7/26* | (2006.01) | |
| *B64D 27/14* | (2006.01) | |
| *B64D 45/00* | (2006.01) | |

(52) U.S. Cl.
CPC ............... *B64D 45/00* (2013.01); *F02C 7/26* (2013.01); *F02C 7/262* (2013.01); *F02C 7/268* (2013.01); *B64D 2045/0085* (2013.01); *F05D 2220/329* (2013.01); *F05D 2260/40311* (2013.01); *F05D 2260/80* (2013.01); *F05D 2260/85* (2013.01); *F05D 2270/093* (2013.01)

(58) Field of Classification Search
CPC .. B64C 27/12; F02C 7/26; F02C 7/262; F02C 7/268; F05D 2220/329; F05D 2260/40311; F05D 2260/80; F05D 2260/85; F05D 2270/093
See application file for complete search history.

(56) References Cited

U.S. PATENT DOCUMENTS

| | | | |
|---|---|---|---|
| 2004/0217883 A1 | 11/2004 | Judge et al. | |
| 2007/0034071 A1 | 2/2007 | Greene | |
| 2010/0100300 A1* | 4/2010 | Brooks | ................... F02B 73/00 |
| | | | 701/102 |
| 2011/0185745 A1 | 8/2011 | Eccles et al. | |
| 2013/0086919 A1 | 4/2013 | Dooley et al. | |
| 2013/0219905 A1 | 8/2013 | Marconi et al. | |
| 2013/0233977 A1 | 9/2013 | Smiley et al. | |
| 2014/0054411 A1* | 2/2014 | Connaulte | ............... B64C 27/14 |
| | | | 244/17.13 |
| 2014/0117148 A1* | 5/2014 | Dyrla | ..................... B64D 31/00 |
| | | | 244/17.13 |
| 2015/0191250 A1 | 7/2015 | Devita et al. | |
| 2016/0311547 A1* | 10/2016 | Rossotto | ................... F02C 3/10 |
| 2017/0016399 A1* | 1/2017 | Bedrine | ................... F02C 7/277 |
| 2017/0184032 A1* | 6/2017 | Poumarede | ............... F02C 7/36 |
| 2017/0211483 A1* | 7/2017 | Thiriet | .................... F02C 7/277 |
| 2017/0218847 A1* | 8/2017 | Thiriet | ..................... F02C 6/08 |
| 2017/0305541 A1* | 10/2017 | Vallart | ..................... F01D 13/00 |
| 2018/0171874 A1* | 6/2018 | Klonowski | ......... F02N 11/0866 |
| 2018/0187604 A1* | 7/2018 | Poumarede | ............... F02C 3/10 |

OTHER PUBLICATIONS

PCT International Search Report and Written Opinion; International Application No. PCT/US2016/043094; International Filing Date: Jul. 20, 2016; dated Oct. 7, 2016; pp. 1-22.

\* cited by examiner

CONTROL SYSTEM FOR ROTORCRAFT IN-FLIGHT ENGINE RESTARTING

CROSS-REFERENCE TO RELATED APPLICATIONS

This application is a National Stage entry application of PCT/US2016/043094, filed on Jul. 20, 2016, which claims priority from U.S. Provisional Application Ser. No. 62/194,464, filed on Jul. 20, 2015, the contents of which are incorporated herein by reference in their entirety.

BACKGROUND

The subject matter disclosed herein relates generally to engine starting systems, and in particular to a control system for restarting a rotorcraft engine while the rotorcraft is in flight.

Existing aircraft occasionally need to restart an engine while the aircraft is in flight. This may be due to a failure experienced by the engine (e.g., a flameout) or due to an intended shut down of the engine in flight. It is sometimes desirable to shut down one or more engines in flight, when power and safety requirements allow, in order to conserve fuel. In order to shut down an engine in flight, an engine restart system needs to have sufficient reliability.

BRIEF SUMMARY

One embodiment includes a control system for an in-flight engine restart system of a rotorcraft. The control system includes an engine control unit operable to control an engine and detect a status of the engine. The control system also includes a flight control computer operable to communicate with the engine control unit, an engine operation control system, and a pilot interface including pilot controls. The engine operation control system includes a processor operable to initiate a health check of the in-flight engine restart system to determine an in-flight engine restart system status. The engine operation control system also processes engine mode of operation commands to establish an engine mode of operation, and delivers commands to aspects of the in-flight engine restart system including the engine control unit based on processing of the engine mode of operation commands. The engine operation control system reports the in-flight engine restart system status and results of the engine mode of operation commands to the flight control computer.

In addition to one or more of the features described above or below, or as an alternative, further embodiments could include where the engine operation control system is operable to control a plurality of engines and detect the status of each of the engines.

In addition to one or more of the features described above or below, or as an alternative, further embodiments could include where at least one of the plurality of engines is designated as a standby engine, and the standby engine is shutdown in flight to establish a fuel saving mode of operation.

In addition to one or more of the features described above or below, or as an alternative, further embodiments could include where a transition request between a multi-engine mode and the fuel saving mode of operation is detected based on the pilot controls or detection of a restart condition by the engine operation control system.

In addition to one or more of the features described above or below, or as an alternative, further embodiments could include where the health check includes collecting health status data from components of the in-flight engine restart system via a vehicle health monitoring system.

In addition to one or more of the features described above or below, or as an alternative, further embodiments could include where the engine operation control system continuously monitors: vehicle health data from the vehicle health monitoring system, engine system health data from the engine control unit, a flight path from the flight control computer, and environmental conditions from environment sensors of the rotorcraft to determine the in-flight engine restart system status and the results of the engine mode of operation commands.

In addition to one or more of the features described above or below, or as an alternative, further embodiments could include where the engine operation control system outputs a pilot request to land to a pilot display based on determining that a failure has occurred that prevents a safe restart of the engine.

In addition to one or more of the features described above or below, or as an alternative, further embodiments could include where the engine operation control system outputs a pilot request to restart the engine and a recommended restart method based on the in-flight engine restart system status, or automatically initiates restart of the engine based on the in-flight engine restart system status and detection of an auto-restart mode selection.

Another embodiment a method of in-flight engine restarting for a rotorcraft includes initiating, by an engine operation control system, a health check of an in-flight engine restart system of the rotorcraft to determine an in-flight engine restart system status. Engine mode of operation commands are processed to establish an engine mode of operation of the rotorcraft. Commands are delivered to aspects of the in-flight engine restart system based on processing of the engine mode of operation commands. The in-flight engine restart system status and results of the engine mode of operation commands are reported to a flight control computer of the rotorcraft.

BRIEF DESCRIPTION OF THE SEVERAL VIEWS OF THE DRAWINGS

Referring now to the drawings wherein like elements are numbered alike in the several FIGURES, in which.

DETAILED DESCRIPTION

Figure 1:
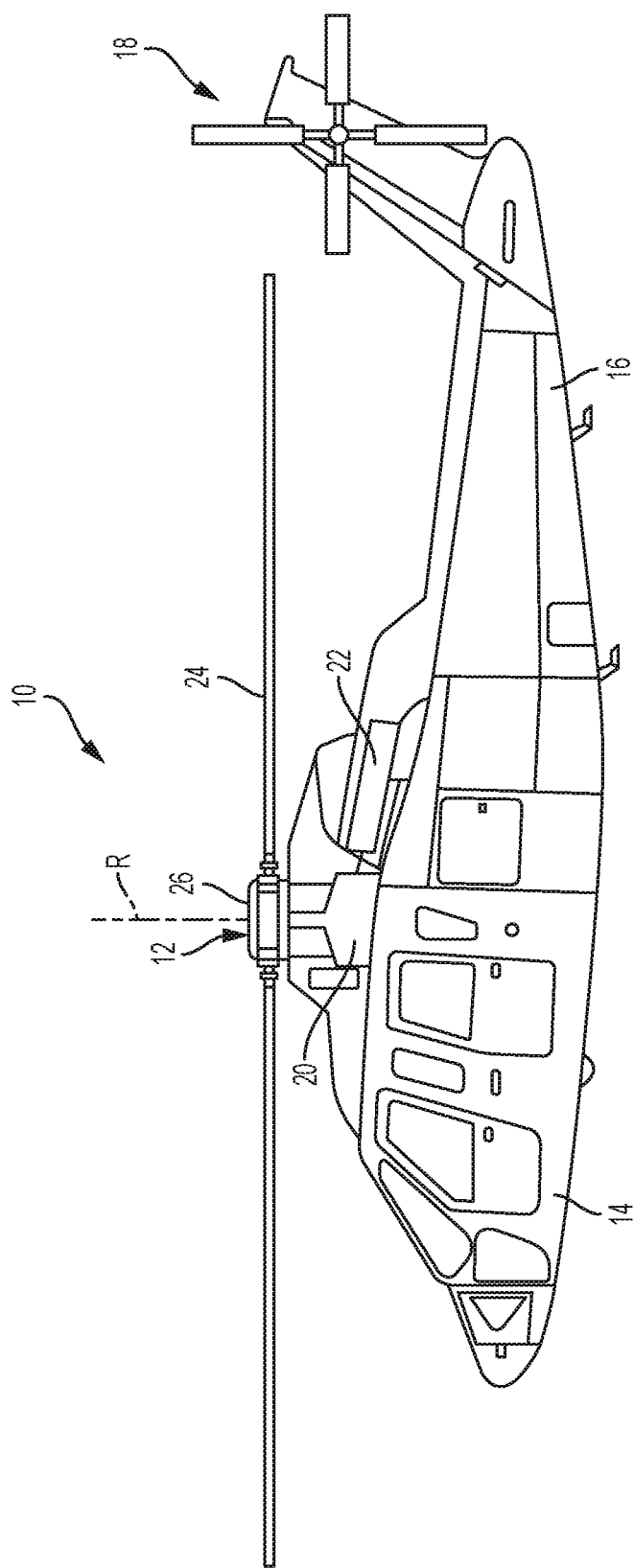
FIG. 1 illustrates an exemplary rotorcraft.

Embodiments include a control system that actively checks and reports health of an engine restart system, which can include health status of one or more engines and the in-flight engine restart system itself. The control system can direct restart operating commands based on a programmed restart sequence for the engine restart system to restart an engine while in flight. The control system reduces the pilot work load of restarting an engine and provides feedback of power availability and readiness.

In an embodiment, the control system includes an engine operation control system operable to control aspects of the in-flight engine restart system and detect health status of the same and other aspects of the in-flight engine restart system. The control system further includes a flight control computer operable to communicate with a pilot interface including pilot controls and a pilot display. The flight control computer can also communicate with the engine operation control system and one or more engine control units. The flight control computer may include a processor operable to detect a transition request from a pilot and deliver commands to the engine operation control system. Alternatively, the engine operation control system can receive pilot inputs directly. The engine operation control system includes a processor operable to detect commands, the health and status of the in-flight engine restart system and one or more engines and deliver commands to aspects of the in-flight engine restart system and one or more engine control units. The engine operation control system can continuously process available inputs to determine if the current operating mode is desired and safe and/or if a transition to a reduced-engine mode of operation or a transition from a the reduced-engine mode of operation to a multi-engine mode of operation is desired and safe or if an emergency mode should be initiated. The engine operation control system can also establish a fuel saving mode of operation by shutting down a standby engine in a multi-engine configuration.

The engine operation control system can communicate back to the flight control computer regular status updates of current operating mode, confirmation of transitions requests, a health status report at time of transition requests, successful transition to a next operating mode, standby engine chosen, other systems online or offline, fault detection and engagement of the emergency mode. The engine operation control system delivers commands to aspects of the in-flight engine restart system including one or more engine control units in accordance with a prescribed schedule of operations. Examples of commands include engagement of drive clutch, engine throttle position, engine ignite, and the like, as further described herein. If a health check or mode transition fails, the pilot can be made aware of why it failed based on data provided from the engine operation control system to the flight control computer, for example. The data can assist the pilot in determining the consequences of potentially overriding the system recommendation based on health status, if the recommendation is based on part usage reasons (e.g., part life) and not safety. Alternatively, the engine operation control system can restart an engine based on the in-flight engine restart system status and detection of an auto-restart mode selection.

FIG. 1 schematically illustrates a rotary-wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a multiple of rotor blades 24 mounted to a rotor hub 26. Although a particular helicopter configuration is illustrated and described in the disclosed embodiment, other multi-engine VTOL configurations and/or machines that transmit mechanical power from internal combustion engines to a main rotor system via a gearbox, whereby the main rotor system provides the primary lift force in hover and the primary propulsive force in forward flight, and given that such configurations exhibit a large disparity between the total vehicle power required for takeoff and hovering flight and the power required for sustained level flight at nominal cruise speeds, such as high speed compound rotary wing aircraft with supplemental translational thrust systems, dual contra-rotating, coaxial rotor system aircraft, turbo-props, tilt-rotors and tilt-wing aircraft, vertical takeoff and landing fixed wing aircraft that are oriented with their wings perpendicular to the ground plane during takeoff and landing (so called tailsitter aircraft) and conventional takeoff and landing fixed wing aircraft, will also benefit from embodiments of the disclosure.

Figure 2:
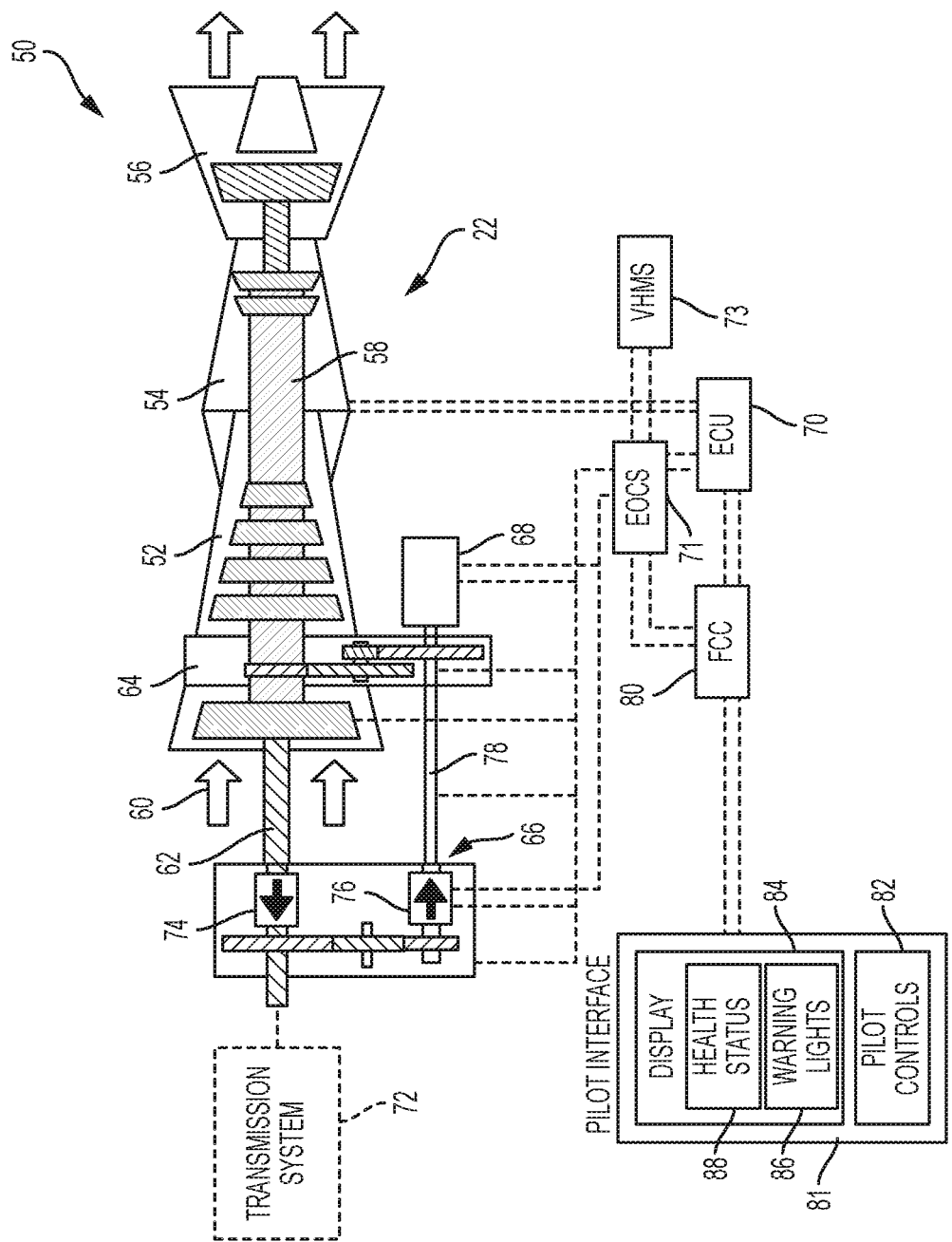
FIG. 2 depicts an engine restart system architecture in an exemplary embodiment.

FIG. 2 depicts a schematic view of an in-flight engine restart system 50 for a rotary wing aircraft 10 (see FIG. 1) according to an exemplary embodiment. In-flight engine restart system 50 includes one or more internal combustion engines 22a-22b (although only one engine 22 is depicted in FIGS. 2 and 4, see FIG. 3), a transmission input module 66, a starter motor 68, an engine control unit 70 such as an Engine Control Unit (ECU), an engine operation control system (EOCS) 71, a flight control computer (FCC) 80, and an accessory gearbox 64. It is to be understood that many of the ancillary systems that may be coupled to internal combustion engines 22a-22b and transmission system 72 such as a fuel system, pumps, individual blade control (IBC) servos, hydraulic actuators, aircraft electric power generators, etc. or the like are not shown in FIG. 2 for ease of description of embodiments of the disclosure.

As illustrated in FIG. 2, internal combustion engine 22 includes a compression section 52, a combustion section 54, a turbine section 56, and a two spool rotor system having a compressor drive shaft 58 and an engine output shaft 62. Typically, compression section 52 compresses inlet air 60 at an intake end of internal combustion engine 22 and provides the compressed air to combustion section 54. Fuel is added to the compressed air, and the resulting mixture is ignited within combustion section 54 in order to produce combustion gases. The combustion gases are directed to turbine section 56, which extracts energy from the combustion gases to rotate compressor drive shaft 58 and the engine output shaft 62. The compressor drive shaft 58 is coupled to accessory gearbox 64 which receives the mechanical energy from the compressor drive shaft 58 to power various accessories like a fuel system, ignition exciters and other accessories to supply electric power for flight operations. Engine output shaft 62 provides the motive force to drive main rotor assembly 12 and tail rotor system 18.

The transmission input module 66 includes a plurality of clutch units 74-76 (i.e., each clutch unit is an overrunning one-way clutch or a controllable engagement clutch) and gears for selectively engaging and disengaging the transmission system 72. During a normal operating mode of the aircraft 10, clutch unit 74, e.g., an overrunning one-way clutch, connects engine output shaft 62 to transmission system 72 (i.e., engages the transmission system 72) when the rotation speed of engine output shaft 62 matches the rotation speed of main rotor assembly 12 and disconnects engine output shaft 62 from transmission system 72 (i.e., disengages the transmission system 72) when the rotation speed of engine output shaft 62 is less than the rotation speed of main rotor assembly 12 so that main rotor assembly 12 may be free to rotate during flight if internal combustion engine 22 fails or is shut down. During this normal operating mode, clutch unit 74 transmits motive force from internal combustion engine 22a to main rotor assembly 12 and tail rotor system 18 (see FIG. 1) and overruns internal combustion engine 22 when engine output shaft 62 is less than the rotation speed of main rotor assembly 12.

Transmission input module 66 further includes a second clutch unit 76, e.g., an overrunning one-way clutch, which is mechanically coupled to an accessory gearbox 64 via a take-off shaft 78. Take-off shaft 78 is also coupled to a starter motor 68 via accessory gearbox 64 for supplementing the power delivered from a second internal combustion engine 22 during in-flight restart. Engine compressor drive shaft 58 may be selectively coupled to transmission system 72 via clutch unit 76 in order to drive engine 22 from a second engine 22 and supplement the power delivered by starter motor 68 during a restart mode. In an embodiment, clutch unit 76 may be continuously engaged to connect accessory gearbox 64 to transmission input module 66 in order to drive accessory gearbox 64 through a second engine 22 via transmission system 72 and provide restart power. In this embodiment, clutch unit 76 is continually engaged and rotates take-off shaft 78 to connect compressor drive shaft 58 to transmission input module 66 during normal operating mode. In another embodiment, clutch unit 76 may be a controllable engagement clutch that selectively engages or disengages transmission system 72 to take-off shaft 78 in order to provide controllable power and drive compressor drive shaft 58 from second engine 22 in order to restart a shut-down engine 22 during an in-flight restart mode. These embodiments will be described in detail below with reference to FIG. 3.

Also, in-flight engine restart system 50 includes an engine control unit 70, such as a Full Authority Digital Engine Controllers (FADEC), that is in communication with one or more internal combustion engines 22. In an embodiment, EOCS 71 is in communication with aspects of the in-flight engine restart system 50, such as transmission input module 66, clutch units 74-76, take-off shaft 78, starter motor 68 and engine control unit 70 and can operate in conjunction with engine control unit 70 to selectively engage clutch unit 76 to connect take-off shaft 78 to transmission input module 66 during the in-flight restart mode. The manner in which engine control unit 70 operates to control internal combustion engine 22 during normal operation and/or in-flight restart may vary according to system design approaches and at a design speed in order to reduce or eliminate the time delay and power required from starter motor 68. In particular, and as will be described in more detail, EOCS 71 provides command signals to and may receive feedback signals from transmission input module 66, starter 68, clutch units 74-76, and engine control unit 70 according to control logic and these commands can come from a pilot or from FCC 80 automation, and the commands may be further modified by engine control unit 70. The EOCS 71 may also collect health status data from components of the in-flight engine restart system 50 via a vehicle health monitoring system (VHMS) 73.

Engine control unit 70, EOCS 71, VHMS 73, and FCC 80 may include memory to store instructions that are executed by a processor. The executable instructions may be stored or organized in any manner and at any level of abstraction, such as in connection with controlling the in-flight engine restart system 50. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms and may be enabled by and/or further enhanced through the use of purpose-designed hydromechanical units or any other device which effects engine starting such as flow dividers, fuel manifolds, fuel injectors, etc. for controlling the internal combustion engine 22, the starter motor 68, in-flight engine restart system 50, and other operational data for rotary wing aircraft 10 (FIG. 1). Although depicted separately, the EOCS 71 may be incorporated in the engine control unit 70, in the VHMS 73, in the FCC 80, or implemented as distributed functionality split between the engine control unit 70, VHMS 73 and/or FCC 80.

The engine control unit 70, the EOCS 71, VHMS 73, and/or the FCC 80 can receive a number of diagnostic inputs that can be used to determine an in-flight engine restart system status. For example, engine control unit 70, EOCS 71 and/or VHMS 73 can monitor the health of the accessory gearbox 64 and the take-off shaft 78 using one or more vibration sensors, speed sensors, strain gages, torque sensors, and the like. The FCC 80 is responsive to pilot controls 82 from pilot interface 81 and may also self-initiate operations such as engine restart based on one or more monitored conditions. The FCC 80 can report multiple indicators to a pilot display 84 of the pilot interface 81, such as warning lights 86 and a health status 88. For example, an unintentional engine shutdown, loss of electrical bus power, and the like may trigger the warning lights 86. A confirmation that a shutdown engine passes health checks before reengaging with the transmission system may be indicated in the health status 88.

Figure 3:
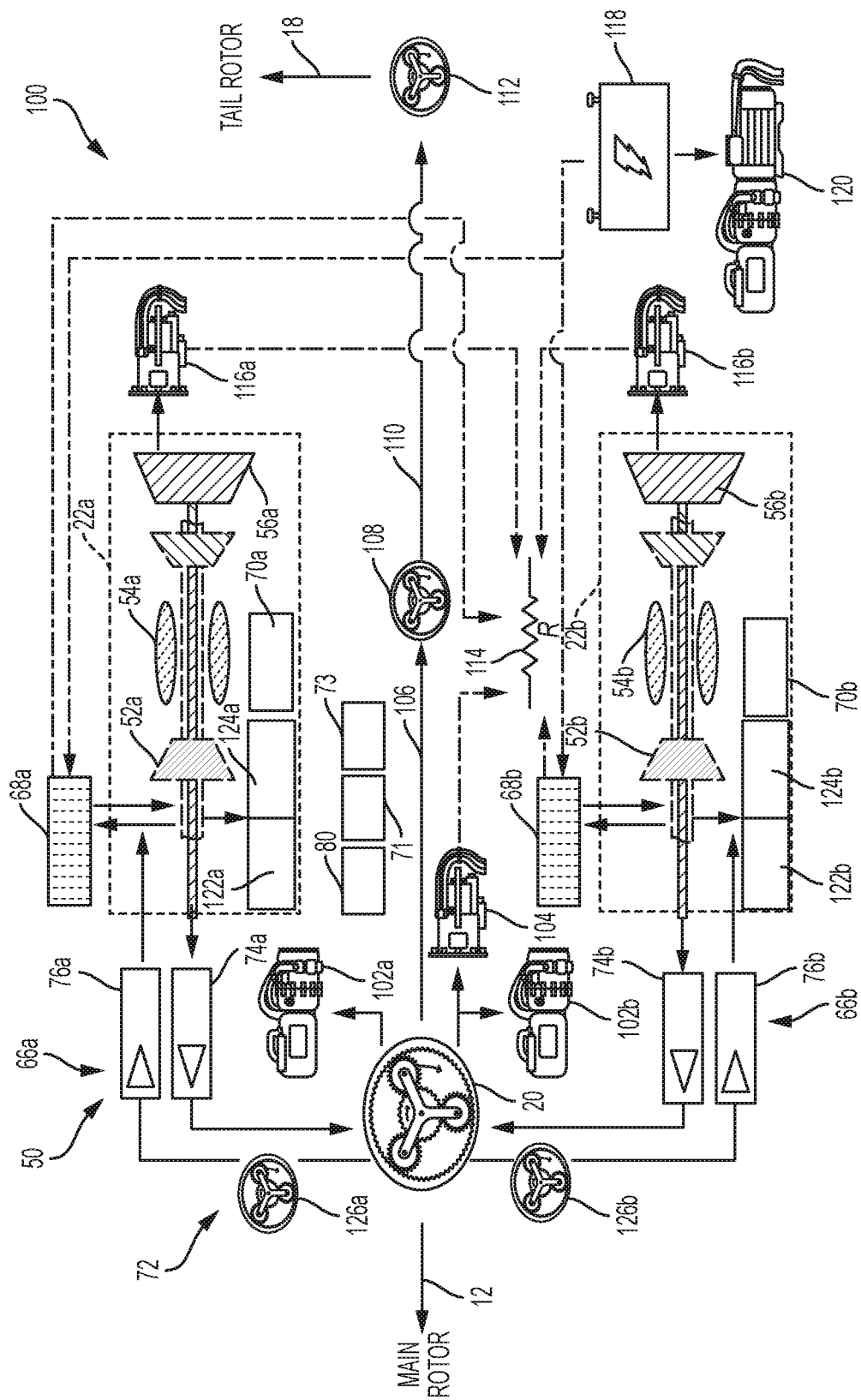
FIG. 3 depicts a control system for an in-flight engine restart system of a rotorcraft in an exemplary embodiment.
Figure 4:
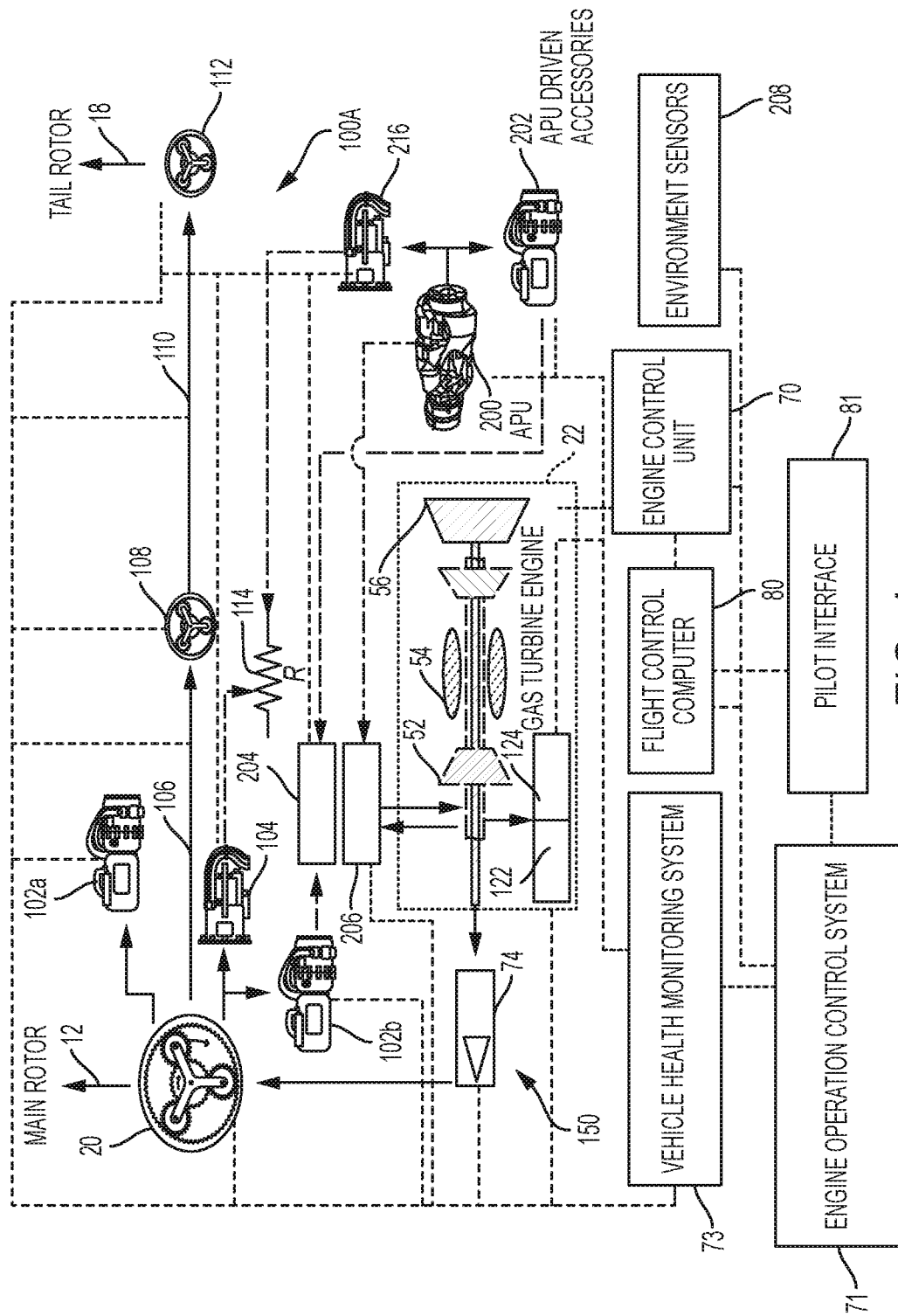
FIG. 4 depicts a control system for an in-flight engine restart system of a rotorcraft in another embodiment.

FIG. 3 depicts a control system 100 for the in-flight engine restart system 50 in an exemplary embodiment. The control system 100 of FIG. 3 includes a number of mechanisms to improve reliability in restarting a rotorcraft engine during flight. The control system 100 includes main gearbox 20 driven by engines 22a and 22b. Main gearbox 20 develops torque for rotorcraft lift, thrust, and control via main rotor assembly 12. The main gearbox 20 also supplies torque to flight accessories 102a-102b (e.g., pumps), an electric generator 104 (e.g., an alternating current or direct current generator), and an intermediate driveshaft 106 that powers the tail rotor system 18 via an intermediate gearbox 108, a tail driveshaft 110, and a tail rotor gearbox 112. The electric generator 104 can power aircraft electrical loads 114 in combination with engine-driven generators 116a and 116b and starter motors 68a and 68b. In one embodiment, one or more of the starter motors 68a and 68b can operate both as motors and as generators. The starter motors 68a and 68b can be powered by a battery 118 and may charge the battery 118 and/or power aircraft electric loads 114 when operated as generators. The battery 118 may also power ground power accessories 120.

In the example of FIG. 3, first engine 22a includes compression section 52a, combustion section 54a, and turbine section 56a that drives engine-driven generator 116a. First engine 22a also drives engine accessories 122a and 124a, such as a fuel pump and ignition exciter. First engine 22a transmits rotational power through clutch unit 74a, e.g., an overrunning one-way clutch, of transmission input module 66a to main gearbox 20. A first engine control unit 70a is operable to control the first engine 22a and detect a status of the first engine 22a. In the example of FIG. 3, a standby control gearbox 126a that can be part of the transmission system 72 or the transmission input module 66a directs power from the main gearbox 20 back through clutch unit 76a, e.g., an overrunning one-way clutch, to maintain a desired engine speed of the first engine 22a after combustion ceases within the first engine 22a due to an engine shutdown. Maintaining rotation of the first engine 22a at an ignition speed or sub-idle speed after combustion within the first engine ceases keeps the first engine 22a in a standby mode of operation, and thus, in such a configuration, the first engine 22a is referred to as a standby engine. Depending upon the actual speed of the first engine 22a in standby mode, the starter motor 68a may be used to further increase the speed of the first engine 22a prior to ignition upon a restart. Total time to restart the standby engine is reduced by maintaining rotation of the standby engine after combustion ceases.

Similarly, second engine 22b includes compression section 52b, combustion section 54b, and turbine section 56b that drives engine-driven generator 116b. Second engine 22b also drives engine accessories 122b and 124b, such as a fuel pump and ignition exciter. Second engine 22b transmits rotational power through clutch unit 74b, e.g., an overrunning one-way clutch, of transmission input module 66b to main gearbox 20. A second engine control unit 70b is operable to control the second engine 22b and detect a status of the second engine 22b. In the example of FIG. 3, a standby control gearbox 126b that can be part of the transmission system 72 or the transmission input module 66b directs power from the main gearbox 20 back through clutch unit 76b, e.g., an overrunning one-way clutch, to maintain a desired engine speed of the second engine 22b after combustion ceases within the second engine 22b due to an engine shutdown. The desired engine speed may be an ignition speed or sub-idle speed. Depending upon the actual speed of the second engine 22b in standby mode, the starter motor 68b may be used to further increase the speed of the second engine 22b prior to ignition upon a restart.

Although a particular system configuration is depicted in FIG. 3, it will be understood that various components can be added, removed or substituted. In one embodiment, clutch units 76a and 76b are replaced with a controllable engagement clutch that is selectively engaged at restart of the standby engine. An actively controlled engagement clutch can reduce the loading placed on the operating engine to drive the standby engine over a longer period of time rather than only when a restart is requested. As a further embodiment, the clutch units 76a and 76b can be removed and an additional generator, such as an integrated motor generator (IMG) can be used to power restart of the standby engine based on power generated by the operating engine. As a further embodiment, an auxiliary power unit (APU) or a supplemental power unit (SPU) can be included to offload electrical and/or mechanical loads during single engine operation and provide restart power for the standby engine.

With reference to FIGS. 1-3, single engine operation may be initiated in response to a pilot input from pilot controls 82, such as an engine selection switch (e.g., a select single engine operation switch) received by FCC 80 and relayed as a mode command to EOCS 71. Prior to transitioning into single engine operation, the EOCS 71 checks the health components of the control system 100. Furthermore, prior to receiving the pilot input from pilot controls 82, pre-transitioning health checks may be performed continuously so that the pilot can be made aware that single engine operation is not feasible prior to single engine operation being requested. This enables the pilot to make alternate flight planning decisions. Based on detecting an adverse health status, the EOCS 71 aborts single engine operation and signals a pilot alert, e.g., on pilot display 84 via FCC 80. If no adverse health status is detected, the EOCS 71 can select an engine 22 to be shut down and alerts the pilot with an indication as to which engine 22 is being placed in standby mode, e.g., first engine 22a or second engine 22b. Selection of the standby engine may alternate between the first engine 22a and second engine 22b to maintain a similar number of operating flight hours. The EOCS 71 can depower a DC bus to unload electric generation from engine-driven generator 116a or 116b, whichever is driven by engine 22 to be placed on standby in single engine operation and alerts the pilot as to which DC bus is shut off (e.g., DC bus 1 or DC bus 2, not depicted) in embodiments where the first engine 22a and second engine 22b each have a DC generator such as engine-driven generators 116a and 116b. The engine control unit 70 sets the throttle of the engine 22 in standby mode to idle, i.e., engine control unit 70a for first engine 22a and engine control unit 70b for second engine 22b. The EOCS 71 can initiate another health status check upon setting the engine 22 in standby mode to idle. Based on detecting an adverse health status, the EOCS 71 aborts single engine operation and signals a pilot alert. If no adverse health status is detected, the engine control unit 70 sets the throttle of the engine 22 in standby mode to stop. A drive system, such as a standby control gearbox 126a or 126b, continues to drive a shaft of the engine, e.g., compressor drive shaft 58, in standby mode at an ignition or sub-idle speed of the engine 22.

Restarting of the engine 22 in standby mode may be initiated based on a pilot request (e.g., from pilot controls 82) or by the EOCS 71 based on detected conditions. Based on a pilot-initiated or EOC-initiated restart request, the EOCS 71 initiates a health status check. Upon detecting an adverse health status, the EOCS 71 can abort the restart and signal a pilot alert. However, if a detected failure can be accommodated, the EOCS 71 and/or engine control unit 70 can attempt accommodating the failure rather than aborting the restart. For example, if a gearbox drive failure is detected, restart may be attempted using the starter motor 68. The engine control unit 70 commands ignition of the engine 22 in standby mode, and the EOCS 71 can command the starter motor 68 to drive the engine 22. The engine control unit 70 confirms restart is achieved and the engine 22 in standby mode has reached idle. The EOCS 71 can command the starter motor 68 to stop. The engine control unit 70 sets the throttle of the engine 22 in standby mode to fly (i.e., an in-flight throttle level), and a pilot alert can be initiated. The EOCS 71 can repower the DC bus that was previously depowered and generate a pilot alert. The EOCS 71 may initiate a health status check and alerts the pilot of a return to dual engine operation upon confirming no adverse health status. If an attempt to restart the engine in standby mode fails, the engine 22 may remain shut down for the duration of the flight.

In summary, the EOCS 71 can initiate a health check of an in-flight engine restart system status and process single-engine mode and dual-engine mode of operation commands to establish a single-engine mode of operation or a dual-engine mode of operation with respect to the first and second engines 22a, 22b. In systems with a greater number of engines 22 (e.g., three engines, four engines, etc.), one or more of the engines can be shut down in a fuel saving mode of operation or due to a fault. The example of FIG. 3 is described with respect to a single-engine and dual-engine mode of operation; however, it will be understood that the process is extendable to any number of engines.

With respect to FIG. 3, the EOCS 71 can deliver commands to aspects of the in-flight engine restart system 50 including one or both of the first and second engine control units 70a, 70b based on processing of the single-engine mode and dual-engine mode of operation commands. Other aspects commanded by the EOCS 71 can include clutch control, starter control, generator control, and other controls for electrical and/or mechanical loads. The EOCS 71 can report the in-flight engine restart system status and results of the single-engine mode and dual-engine mode of operation commands to the FCC 80 to output on pilot display 84 and/or take further actions.

FIG. 4 depicts a further example of a control system 100A for an in-flight engine restart system 150 of a rotorcraft, such as a single-engine embodiment of the rotorcraft 10 of FIG. 1. Similar to the examples of FIGS. 2 and 3, the control system 100A controls engine 22 that includes compression section 52, combustion section 54, and turbine section 56. Engine 22 drives engine accessories 122 and 124, such as a fuel pump and ignition exciter, and transmits rotational power through clutch unit 74, e.g., an overrunning one-way clutch, to main gearbox 20. Engine control unit 70 is operable to control the engine 22 and detect a status of the engine 22. In FIG. 4, the main gearbox 20 also supplies torque to flight accessories 102a-102b (e.g., pumps), an electric generator 104 (e.g., an alternating current generator), and an intermediate driveshaft 106 that powers the tail rotor system 18 via an intermediate gearbox 108, a tail driveshaft 110, and a tail rotor gearbox 112. The electric generator 104 can power aircraft electrical loads 114 in combination with an APU-driven generator 216, where an APU 200 can also drive APU-driven accessories 202 and a pneumatic starter motor 204 for engine 22. The APU-driven accessories 202 and/or flight accessories 102b can drive a hydraulic starter motor 206 for engine 22. In the example of FIG. 4, the EOCS 71 can also interface with environmental sensors 208 to determine environmental parameters external to the rotorcraft, e.g., weather conditions that may impact engine restart decisions.

In the example of FIG. 4, the EOCS 71 can initiate a health check of the in-flight engine restart system 150 to determine an in-flight engine restart system status. The EOCS 71 processes engine mode of operation commands to establish an engine mode of operation. The engine 22 may operate in a normal mode of operation when no faults are detected, a degraded mode of operation when one or more faults are detected that reduce performance of the engine 22, or the engine 22 may shutdown, e.g., due to a flameout. The EOCS 71 delivers commands to aspects of the in-flight engine restart system 150 including the engine control unit 70 based on processing of the engine mode of operation commands. For example, commands can be delivered to initiate diagnostic activity or attempt to restart the engine 22 during an in-flight shutdown. The EOCS 71 can report the in-flight engine restart system status and results of the engine mode of operation commands to the flight control computer 80.

Health checks can include collecting health status data from components of the in-flight engine restart system 150 via the VHMS 73. Examples of health status data includes gearbox temperature(s), engine temperature(s), altitude, terrain/obstacles, weather conditions, fuel pressure, fuel level, vibrations, ignition system, hydraulic pressure, bleed air pressure, APU status, and the like. In some embodiments the health status data is continuously monitored and received from multiple sources such as vehicle health data from the VHMS 73, engine system health data from the engine control unit 70, a flight path (e.g., altitude, terrain/obstacles, etc.) from the flight control computer 80, and environmental conditions from environment sensors 208 of the rotorcraft to determine the in-flight engine restart system status and the results of the engine mode of operation commands. Depending upon which portions of the in-flight engine restart system 150 are degraded or operational, the EOCS 71 can determine a level of urgency of response and a recommended action. For instance, the EOCS 71 can output a pilot request to land to pilot display 84 of FIG. 2 based on determining that a failure has occurred that prevents a safe restart of the engine 22. Alternatively, the EOCS 71 may output a pilot request to restart the engine 22 and a recommended restart method based on the in-flight engine restart system status. As a further alternative, the EOCS 71 may automatically initiate restart of the engine 22 based on the in-flight engine restart system status and detection of an auto-restart mode selection.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A control system for an in-flight engine restart system of a rotorcraft, the control system comprising:
   an engine control unit operable to control an engine and detect a status of the engine;
   a flight control computer operable to communicate with the engine control unit, an engine operation control system, and a pilot interface comprising pilot controls; and
   the engine operation control system comprising a processor operable to:
   initiate a health check of the in-flight engine restart system to determine an in-flight engine restart system status;
   process engine mode of operation commands to establish an engine mode of operation;
   deliver commands to aspects of the in-flight engine restart system including the engine control unit based on processing of the engine mode of operation commands; and
   report the in-flight engine restart system status and results of the engine mode of operation commands to the flight control computer; and
   output a pilot request to restart the engine and a recommended restart method based on the in-flight engine restart system status, or automatically initiate restart of the engine based on the in-flight engine restart system status and detection of an auto-restart mode selection.

2. The control system of claim 1, wherein the engine operation control system is operable to control a plurality of engines and detect the status of each of the engines.

3. The control system of claim 2, wherein at least one of the plurality of engines is designated as a standby engine, and the standby engine is shutdown in flight to establish a fuel saving mode of operation.

4. The control system of claim 3, wherein a transition request between a multi-engine mode and the fuel saving mode of operation is detected based on the pilot controls or detection of a restart condition by the engine operation control system.

5. The control system of claim 1, wherein the health check comprises collecting health status data from components of the in-flight engine restart system via a vehicle health monitoring system.

6. The control system of claim 5, wherein the engine operation control system continuously monitors: vehicle health data from the vehicle health monitoring system, engine system health data from the engine control unit, a flight path from the flight control computer, and environmental conditions from environment sensors of the rotorcraft to determine the in-flight engine restart system status and the results of the engine mode of operation commands.

7. The control system of claim 1, wherein the engine operation control system outputs a pilot request to land to a pilot display based on determining that a failure has occurred that prevents a safe restart of the engine.

8. A method of in-flight engine restarting for a rotorcraft, the method comprising:
   initiating, by an engine operation control system, a health check of an in-flight engine restart system of the rotorcraft to determine an in-flight engine restart system status;
   processing engine mode of operation commands to establish an engine mode of operation of the rotorcraft;
   delivering commands to aspects of the in-flight engine restart system including an engine control unit based on processing of the engine mode of operation commands;
   reporting the in-flight engine restart system status and results of the engine mode of operation commands to a flight control computer of the rotorcraft; and
   outputting a pilot request to restart the engine and a recommended restart method based on the in-flight engine restart system status, or automatically initiating restart of the engine based on the in-flight engine restart system status and detection of an auto-restart mode selection.

9. The method of claim 8, wherein the engine operation control system is operable to control a plurality of engines and detect the status of each of the engines.

10. The method of claim 9, wherein at least one of the plurality of engines is designated as a standby engine, and the standby engine is shutdown in flight to establish a fuel saving mode of operation.

11. The method of claim 10, wherein a transition request between a multi-engine mode and the fuel saving mode of operation is detected based on pilot input received from pilot controls or detection of a restart condition by the engine operation control system.

12. The method of claim 8, wherein the engine operation control system continuously monitors: vehicle health data from a vehicle health monitoring system, engine system health data from the engine control unit, a flight path from the flight control computer, and environmental conditions from environment sensors of the rotorcraft to determine the in-flight engine restart system status and the results of the engine mode of operation commands.

13. The method of claim 8, wherein the engine operation control system outputs a pilot request to land to a pilot display based on determining that a failure has occurred that prevents a safe restart of the engine.

* * * * *